US011641864B2

(12) United States Patent
Ukuku

(10) Patent No.: US 11,641,864 B2

(45) Date of Patent: May 9, 2023

(54) SYNERGISTIC ANTIBROWNING-ANTIMICROBIAL COMPOSITION

(71) Applicant: The United States of America, as represented by the Secretary of Agriculture, Washington, DC (US)

(72) Inventor: Dike O. Ukuku, Philadelphia, PA (US)

(73) Assignee: The United States of America, as represented by The Secretary of Agriculture, Washington, DC (US)

( * ) Notice: Subject to any disclaimer, the term of this patent is extended or adjusted under 35 U.S.C. 154(b) by 0 days.

(21) Appl. No.: 17/020,363

(22) Filed: Sep. 14, 2020

(65) Prior Publication Data

US 2021/0076712 A1 Mar. 18, 2021

Related U.S. Application Data

(60) Provisional application No. 62/900,888, filed on Sep. 16, 2019.

(51) Int. Cl.

| | |
|---|---|
| ***A23L 3/3508*** | (2006.01) |
| ***A23B 7/154*** | (2006.01) |
| ***A23L 3/3463*** | (2006.01) |
| ***A23B 7/10*** | (2006.01) |

(52) U.S. Cl.

CPC .............. *A23L 3/3508* (2013.01); *A23B 7/10* (2013.01); *A23B 7/154* (2013.01); *A23L 3/34635* (2013.01); *A23V 2002/00* (2013.01)

(58) Field of Classification Search

CPC .... A23L 3/3508; A23L 3/34635; A23L 3/358; A23B 7/10; A23B 7/154; A23B 7/157

See application file for complete search history.

(56) References Cited

U.S. PATENT DOCUMENTS

| | | | | |
|---|---|---|---|---|
| 3,245,807 | A * | 4/1966 | Colby | A23B 7/154 426/325 |
| 6,867,233 | B2 * | 3/2005 | Roselle | A23L 3/3508 514/561 |
| 2005/0191393 | A1 * | 9/2005 | Postma | A23B 7/157 426/324 |
| 2008/0085346 | A1 | 4/2008 | Kravitz et al. | |
| 2009/0192231 | A1 * | 7/2009 | Lemons | B08B 3/08 514/738 |
| 2016/0302455 | A1 * | 10/2016 | Ukuku | A23L 3/3526 |
| 2018/0360060 | A1 * | 12/2018 | Pisanova | A23B 7/157 |
| 2019/0316065 | A1 * | 10/2019 | Salminen | C11D 1/28 |

FOREIGN PATENT DOCUMENTS

| | | | |
|---|---|---|---|
| WO | 03103408 | A1 | 12/2003 |

OTHER PUBLICATIONS

Martin, H. et al., "Synergism between hydrogen peroxide and seventeen acids against six bacterial strains", Journal of Applied Microbiology, 2012, vol. 113, pp. 578-590.

Suttirak, W. et al., "Potential Application of Ascorbic Acid, Citric Acid and Oxalic Acid for Browning Inhibition in Fresh-Cut Fruits and Vegetables",Walailak J. Sci & Tech., 2010, vol. 7, No. 1, pp. 5-14.

Valiolahi, M. et al., "Effects of organic acid alone and in combination with H2O2 and NaCI on *Escherichia coli* O157:H7: An evaluation of antioxidant retention and overall acceptability in Basil leaves (*Ocimum basilicum*)", International Journal of Food Microbiology, Dec. 14, 2018, vol. 292, pp. 56-63.

International Search Report, dated Jan. 29, 2021.

* cited by examiner

*Primary Examiner* — Nikki H. Dees

(74) *Attorney, Agent, or Firm* — John D. Fado; Maria Restrepo-Hartwig

(57) ABSTRACT

A synergistic composition of oxalic acid, citric acid, ascorbic acid, lactic acid, and hydrogen peroxide that has a combination of antimicrobial and antibrowning properties.

8 Claims, 10 Drawing Sheets
(3 of 10 Drawing Sheet(s) Filed in Color)

SYNERGISTIC ANTIBROWNING-ANTIMICROBIAL COMPOSITION

REFERENCE TO RELATED APPLICATION

This application claims the benefit of U.S. Provisional Application No. 62/900,888, filed 16 Sep. 2019, which is incorporated herein by reference in its entirety.

FIELD OF THE INVENTION

This invention relates to a dual action antibrowning and antimicrobial solution for produce including whole and fresh-cut fruits and vegetables. More specifically, the invention elates to a synergistic solution containing a combination of individual short chain organic acid compounds and hydrogen peroxide.

BACKGROUND OF THE INVENTION

Microbial contamination and browning are a major concern of the agriculture industry. Bacterial populations existing on produce, browning of produce such as whole and fresh-cut fruits and vegetables, and possible contamination by harmful pathogens is of practical significance to producers, processors, and consumers. Produce industries usually wash produce surfaces as a multi-step process with a sanitizer before fresh-cut preparation and dipping in another solution with antibrowning capacity.

Microbial populations on fruits and vegetables varies due to frequent contact with soil, insects, animals, or humans during growing or harvesting and in the processing plant (Ukuku, D. O., et al., J. Food Prot., 75: 1912-1919 (2012)). Fresh fruit and vegetable produce are ranked as the fourth food category responsible for foodborne illnesses in the United States, being implicated in 1.2 million illnesses, 7,100 hospitalizations, 134 human deaths, and $1.4 billion in associated illness costs each year (Batz, M. B., et al., Identifying the most significant microbiological foodborne hazards to public health: a new risk ranking model, Food Safety Research Consortium Discussion Paper, No. 1 (2011)). The presence of human bacterial pathogens on fresh produce and outbreaks of diseases has led to costly recalls (Food and Drug Administration, Guidance for Industry: Guide to Minimize Microbial Food Safety Hazards of Fresh-cut Fruits and Vegetables, 2008; Centers for Disease Control, Morbid. Mortal. Weekly Rep., 60: 1357-1358 (2011)).

In all stages of production to consumption, fresh produce is stored at various temperatures and conditions. For example, fresh fruit prepared at home may be left at room temperature for several hours before consumption or refrigeration for later use. Bacterial populations on fruits surfaces transfer to the fresh-cut pieces during preparation and can survive and grow when such cut pieces are left standing at room temperature before consumption. Cutting fresh produce allows exudates of internal cellular materials, including nutrients which may aid bacterial proliferation, on contaminated pieces and consequently leads to produce degradation (Watada, A. E., et al., Food Technol., 44: 116-122 (1990); Weatherspoon, L., et al., Nutrient Loss, Chapter 8, IN: Produce degradation; pathways and prevention, Lamink-anra, O., et al., eds, Taylor and Francis, New York, 2005).

Transfer, survival, and growth of the human pathogen *Salmonella* Poona from cantaloupe rind surfaces to fresh-cut pieces during fresh-cut preparation and during storage at room or refrigeration temperatures has been observed (Ukuku, D. O., J. Food Microbiol., 95: 137-146 (2004)). Similarly, presence of *Listeria monocytogenes* has been documented in fresh apples (FDA, Analysis and Evaluation of Preventive Control Measures for the Control and Reduction/Elimination of Microbial Hazards on Fresh and Fresh-Cut Produce: Chapter IV, Outbreaks Associated with Fresh and Fresh-Cut Produce. Incidence, Growth, and Survival of Pathogens in Fresh and Fresh-Cut Produce, 2015), sliced apples (Granny Smith Apples & Gals Apples From Bidart Bros. Recalled, CFIA (2015); FDA, Import Alert #22-01 (2016)), and stone fruits including whole peaches, nectarines, plums, and pluots leading to several recalls (Jackson et al., Emerg Infect Dis.; 19: 1239-1244 (2013). An FDA survey of imported fresh produce reported incidences of 5.3% positives for *Salmonella* and 2% for *Shigella* in 151 samples of cantaloupes, in which all contaminated samples originated in Mexico, Costa Rica and Guatemala (FDA, Duck Delivery Produce Recalls cut honeydew and cut cantaloupe melon for possible health risk, 2003; FDA, 2016). Other human pathogens, including *Listeria monocytogenes, Escherichia coli* O157:H7, *Salmonella* and *Shigella* are capable of survival and/or growth on melon flesh (Food and Drug Administration, 2008; Ukuku, D. O., et al., Inter. J. Food Microbiol., 104: 225-233 (2005)).

Several antimicrobial washing treatments, including chlorine and short chain organic acids for reducing microbial populations on cantaloupe rind surfaces, have yielded limited results as the presence of microbes were still observed in fresh-cut pieces from such treated melons (Ukuku, D. O., and W. F. Fett, J. Food Prot., 67: 2143-2150 (2004); Ukuku, D. O., J. Food Microbiol., 95: 137-146 (2004); Johnson, M. D., et al., J. Microbiol. Methods., 60: 403-411 (2005); Ibrahim, S. A., et al., Food Chem., 109: 137-143 (2008); Heaton, J. C., and K. Jones, J. Appl. Microbiol., 104: 613-626 (2007); Rahman, M. S., Hand book of food preservation, 2nd ed., p. 140-141, 2007, CRC Press, Taylor and Francis, Boca Raton, Fla.; Gyawali, R., et al., Antimicrobial activity of copper alone and in combination with lactic acid against *Escherichia coli* O157:H7 in laboratory medium and on the surface of lettuce and tomatoes, J. Path., Volume 2011, Article ID 650968, 2011; Huang, Y., and H. Chen, Food Control, 22(8): 1178-1183 (2011); Ukuku, D. O., et al., J. Food, Agric and Environ., 11 (3&4): 340-345 (2013); CDC, Disinfection By-Products, 2016). The amount of chlorine in the wash water for produce surfaces is usually up to 200 ppm as suggested in Federal regulations (21 CFR-Part 173, 21 CFR Part 178 permit). The chlorine wash treatments do not inactivate all bacterial populations on produce surfaces and can only achieve approximately 1 to 2 log reductions depending on type and method of application. Also, there is a concern of potential formation of harmful by-products by chlorine (CDC, 2016) prompting the need for alternative antimicrobial wash treatments. The antimicrobial properties of hydrogen peroxide ($H_2O_2$) have been reported (Johnson, et al., 2005; Azanza, P. V., *Salmonella*, p. 5.01-5.19, IN: FDA Bacteriological Analytical Manual, 8th ed., 2004, Association of Official Analytical Chemists, Gaithersburg, Md.; Ukuku, D. O., Int. J. Food Microbiol., 95: 137-146 (2004); Ukuku, D. O., et al, 2005; Ukuku, D. O., et al, Hydrogen peroxide, IN: Decontamination of minimally processed produce, Chapter 11, 2011, Vicente, M. Gomez-Lopez (ed), Wiley and Blackwell, NY; Ukuku et al, 2013; Ukuku, D. O., et al., J. Food Prot., 78: 1288-1295 (2014)). The activities of $H_2O_2$ vapor as a sporicidal and mycobactericidal (Hall, L., et al., J. Clin. Microbiol., 45: 810-815 (2007); Johnson et al., 2005) on produce surfaces or for the decontamination of surfaces and medical equipment (Boyce, J. M., et al., Infect. Control Hosp. Epidemiol., 29: 723-729 (2008); French, G. L., et al., Trackling contamination of the hospital environment by methicilin-resistant *Staphylococcus aureus* (MARS): a comparison between conventional terminal cleaning and hydrogen (2004); Otter, A. J., and G. L. French, J. Clin. Microbiol., 47: 205-207 (2009)) has been reported. The efficacy of lower concentration of hydrogen peroxide ($H_2O_2$, 0.5%) in combination with a cationic polymer, ethoxylated fatty alcohol, and ethyl alcohol was found to be bactericidal against *Escherichia coli, Staphylococcus aureus, Enterococcus hirae*, and *Pseudomonas aeruginosa* on stainless steel surfaces (Rios-Castillo, A. G., et al., J. Food Sci. Food Microbiology & Safety, 82(10): 2351-2356 (2017); Ukuku et al., Food Science and Technology, 104: 120-127 (2019)) reported use of lower concentration (1.5% $H_2O_2$) in combination with minimal thermal treatments in reducing bacterial populations on melon surfaces and transfer to fresh-cut pieces during fresh-cut preparation. Methods of washing treatments for reducing bacterial populations on melon rind surfaces have been reported (Ukuku & Fett, 2004; Fleming, P., et al., Commodity Specific Food Safety Guidelines for the Melon Supply Chain. Produce Marketing Association; Newark, Del., United Fresh Fruit and Vegetable Association, Washington, D.C., pages p. 1-39 (2005), Parnell, T., et al., International Journal of Food Microbiology, 99(1): 59-70 (2005)) and the amount of chlorine in the wash water is usually up to 200 ppm as suggested in the Federal regulations (21 CFR-Part 173, 21 CFR Part 178 permit).

Enzymatic browning, especially in fruits such as apples, pears, peaches, bananas, and strawberries (Lepoz-Serrano, M., and A. Ros Barcelo, J. Agric. Food Chem., 47:824-827 (1999); Rojas, M. A., et al., J. Food Sci., 73(6): S267-S272 (2008)) is also a major problem for the produce industries, especially the fresh-cut industries. Color deterioration of fresh-cut produce is usually caused by the oxidation of polyphenol oxidase (PPO) and peroxidase (PO) which ultimately leads to the formation of dark brown polymers of quinoidal nature (Lee, C. Y., Enzymatic oxidation of phenolic compounds in fruits, IN: Phenolic compounds in foods and their effects on health 1, Analysis, occurrence and chemistry, Ho, C-T., et al. eds, ACS Symp. Ser. 506, pages 305-307, Washington, D C, 1992; Cetin-Karaca, H., Evaluation of natural antimicrobial phenolic compounds against foodborne pathogens, University of Kentucky Master's Theses, Paper 652 (2011); He, Q., et al., Food Chem., 110: 847-851 (2008); Mahajan, P. V., et al., Phil. Trans. R. Soc. A 372: 20130309 (2014)). These changes in colors of minimally processed fresh-cut produce may lead to economic loss due to unacceptability of the produce by consumers. The mechanism of how enzymes contribute to vegetable and fruit degradation is not fully understood; however, it is known that fungal polyphenol oxidase has an antioxidant effect in juice systems by removing residual oxygen present to preserve flavor and color. A group of enzymes called cellulase and hemicellulase have all been implicated in the degradation of cellulose, a major structural component of plant cell walls. Dehydration of plant cells results in a loss of cell turgor which provides textural "crispness" to fresh vegetables. The produce firmness is related to cellular characteristics such as cell walls, intracellular turgor pressure, the number and sizes of intercellular spaces, and cell-to-cell adhesion. However, fruits are very susceptible to undesirable alterations such as changes in texture, flavor, and color because of injury suffered during storage, handling, and processing (Watada et al., 1990). Most solutions available to the fresh-cut industries as antibrowning agents are generally composed of ascorbic acid, meaning that fresh-cut processing involves 2 steps including first treating the fruits with sanitizer solution followed by processing and treating the fresh-cut pieces with antibrowning solution.

There thus exists an ongoing need in the agricultural produce and fresh-cut fruit and vegetable industries for more effective solutions and methods of antibacterial and antibrowning treatments to respond to demands for products that are safe, fresh, and convenient for use. There is a particular need for a novel solution that has a dual capacity as both antimicrobial and antibrowning in a one-step process.

SUMMARY OF THE INVENTION

To address these challenging issues in the agricultural produce industry, the present invention accordingly provides novel compositions to simultaneously combat both bacteria and browning in whole as well as fresh-cut fruits and vegetables. The invention provides a synergistic combination of agents that provide surprising combined antibacterial and antibrowning functionality. In an aspect, the invention includes a mixture of oxalic acid, citric acid, lactic acid, ascorbic acid, and hydrogen peroxide. In another aspect, the invention includes methods of reducing bacteria and browning in fresh fruits and vegetables by applying the mixture to produce or produce production processes.

It is an advantage of the invention to provide novel compositions effective to reduce or eliminate bacterial contamination in fresh fruits and vegetables.

It is another advantage of the present invention to provide novel compositions effective to maintain physical and chemical attributes of fresh-cut fruit by preventing browning including enzymatic browning.

It is a further advantage of the present invention to provide one-step antibrowning-antimicrobial combination treatments for fresh fruits and vegetables including both whole and those designated for fresh-cut preparation.

It is yet another advantage of the present invention to provide compositions and methods of reducing or eliminating a large variety of gram-negative and gram-positive bacterial species on fruits and vegetables.

An additional advantage of the invention is to aid in reducing waste of fruits and vegetables due to discoloration.

Yet another advantage of the invention is to help reduce economic losses related to contaminated fruits and vegetables from bacterial infestaions, foodborne illnesses, recalls, and plant closures.

This summary is provided to introduce a selection of concepts in a simplified form that are further described below in the detailed description. This summary is not intended to identify all key or essential features of the claimed subject matter, nor is it intended to limit the scope of the claimed subject matter.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE INVENTION

Figure 1:
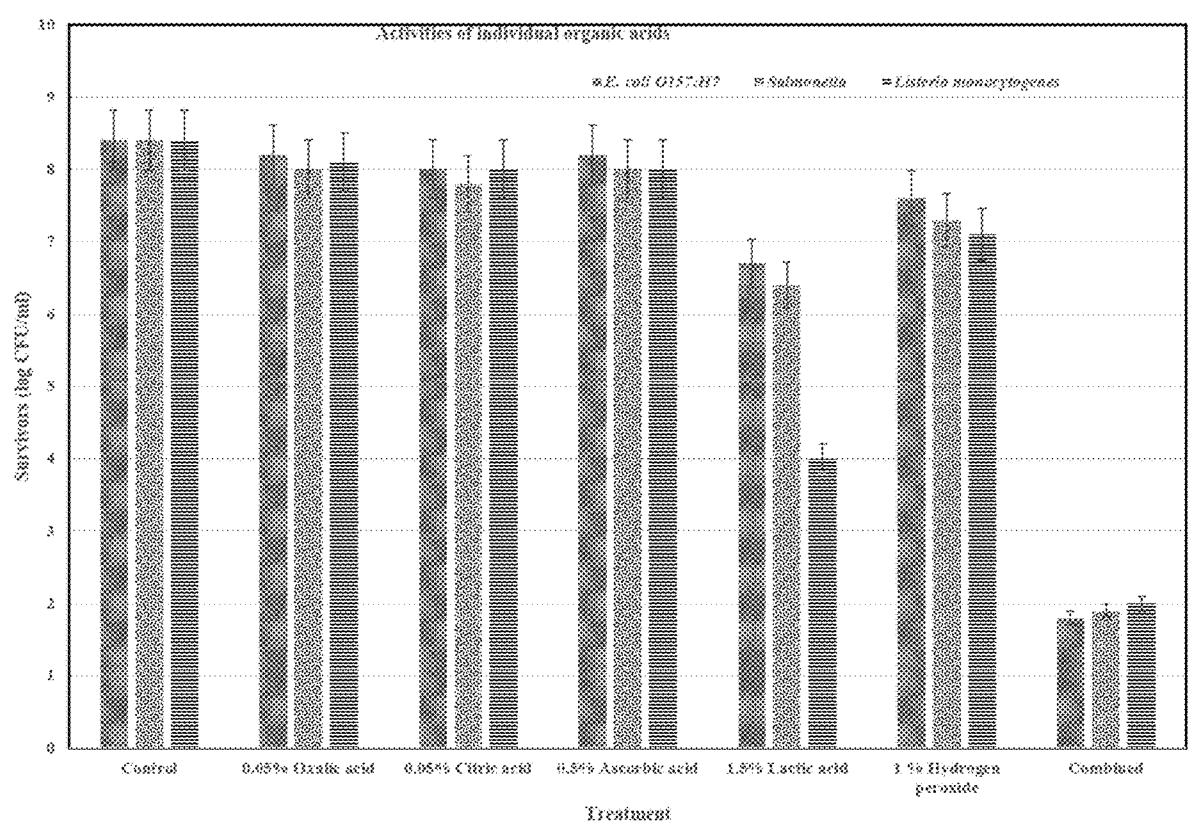
FIG. 1 illustrates the effect of individual organic acids on bacterial inactivation within 10 min of contact time as described herein.

Unless herein defined otherwise, all technical and scientific terms used herein generally have the same meaning as commonly understood by one of ordinary skill in the art to which this invention belongs. The definitions and terminology herein described for embodiments may or may not be used in capitalized as well as singular or plural form herein and are intended to be used as a guide for one of ordinary skill in the art to make and use the invention and are not intended to limit the scope of the claimed invention. Mention of trade names or commercial products herein is solely for the purpose of providing specific information or examples and does not imply recommendation or endorsement of such products.

As used in the description of the invention and the appended claims, the singular forms "a," "an," and "the" are intended to include the plural forms as well, unless the context clearly indicates otherwise.

The term "effective amount" of a compound or property as provided herein is meant such amount as is capable of performing the function of the compound or property for which an effective amount is expressed. As is pointed out herein, the exact amount required will vary from process to process, depending on recognized variables such as the compounds employed and various internal and external conditions observed as would be interpreted by one of ordinary skill in the art. Thus, it is may not be possible to specify an exact "effective amount," though preferred ranges have been provided herein. An appropriate effective amount may be determined, however, by one of ordinary skill in the art using only routine experimentation.

The term "optional" or "optionally" means that the subsequently described event or circumstance may or may not occur, and that the description includes instances and embodiments in which said event or circumstance occurs and instances and embodiments where it does not. For example, the phrase "optionally comprising rinsing the composition" means that the method may or may not contain a rinsing step and that this description includes methods that contain and do not contain a rinsing step.

Many organic acids have the capacity to inhibit microbial growth, act as antioxidants, and cause dysfunction of certain enzymatic activity. The mechanism of antimicrobial activity of most organic acid compounds are generally associated with the undissociated form which dissociates inside bacterial cells and changes the internal pH of the bacteria to disrupt substrate transport by altering cell membrane permeability. For example, lactic acid lowers bacterial water activity through dehydration of the protoplasm leading to plasmolysis, and ascorbic acid functions as an antioxidant by breaking chain of reactions that led formation of melanin (browning usually seen on the surfaces of fresh-cut fruits and vegetables) without damaging or changing the physical attributes of the produce. The present invention relates to a novel solution including a combination of organic acids with antimicrobial and antibrowning capacity for treating fresh produce. The organic acids used in the inventive composition are natural substances found in various fruits and or byproducts of fermented foods. The U.S. Food and Drug Administration classified organic acids as "generally recognized as safe" (GRAS) for human consumption. This invention provides a solution with both antimicrobial and antibrowning capability with will save the industry time, money, and help in preventing costly recalls from microbial contamination of produce.

The composition of the present invention may be used as a processing aid for produce for application directly to the produce at various stages as well to equipment. The composition includes a mixture of oxalic acid, citric acid, lactic acid, ascorbic acid, and hydrogen peroxide. This mixture in the disclosed concentration range was found to surprisingly and synergistically decrease viable populations of undesirable bacteria present in produce (e.g., fruits, vegetables, leafy greens, etc.). Though these acids are naturally-occurring, the synergism achieved in the disclosed composition is surprising and unexpected. Oxalic acid is abundant in leafy spinach, while citric acids are high in grapefruit, oranges, lemons, limes, with lemons and limes containing the most at an average of approximately 4 grams per 100 grams of fruit. Ascorbic acid (commonly referred to as Vitamin C) is also abundant in the fruits listed above including certain vegetables like broccoli, sprouts, and cauliflower. Lactic acid is abundant in soy sauce, cheese, yogurt, meat products and pickled vegetables, as a natural byproduct of food fermentation. Several fruits and vegetables, such as tomatoes, cabbage, green peppers, apples, oranges, watermelons, including humans and other animals have small amounts of hydrogen peroxide.

In embodiments, the composition includes the following ranges of components on a weight-to-volume percent basis (to be interpreted as having the term "about" preceding each range) in aqueous solution as shown in Table 1. The pH level of the inventive composition is from about 1 to about 5 in various embodiments. At higher concentrations (e.g., about 5% to about 20%), the individual components exhibit a level of antimicrobial activity but generally require rinsing after each use typically with sterile wash water. At slightly lower levels (e.g., about 2% to about 5%), the individual components generally continue to exhibit a minimal level of antimicrobial activity and still require a rinsing step. At still lower levels (e.g., about 1% to about 3%), the individual components provide an even lower level of bacterial reduction. The narrow concentration ranges of the individual components in Table 1 do not provide a minimal level of antimicrobial activity and when combined in the inventive composition provide a surprisingly effective and synergistic level of antimicrobial activity.

The inventive composition may also be prepared from a more concentrated form such as a solid or powder of each component. For example, the active ingredients may be mixed with a solid diluent or in combination with a pH buffer (or pH adjustment mechanism such an inorganic acid or base) which the user would mix with an aqueous diluent to produce a usable concentration of the inventive composition. In another example, the components may be preformulated in a sachet or other container that would preserve the integrity of the components until use. The sachet could be opened and poured into the correct pre-measured amount of an aqueous diluent. Alternatively, the sachet type is selected from a variety of materials, such as biodegradable or bio-based plastic. In another example, the sachet is water-soluble plastic which could dropped into a pre-measured amount of water to achieve an aqueous composition having the desired concentration. Furthermore, in embodiments the invention also provides kits which are useful for carrying out methods of the present invention. The kit includes a container comprising compositions of the present invention and instructions for using the compositions for the purposes disclosed herein. The kits can comprise a first container means containing the compositions described herein. The kit can also comprise other container means having one or more solutions, diluents, pH adjustors, pH buffers, and/or applicators necessary or convenient for carrying out the invention. The container means can be made of glass, plastic, foil, the like, and combinations thereof and can be any suitable vial, bottle, pouch, tube, bag, box, etc. The kit can also contain written information, such as procedures for carrying out the present invention or analytical information, such as the amount of reagent contained in the first container means. The container means can be in another container means (e.g., a box, bag, etc.) along with the written information.

This inventive composition achieved a synergistic and surprisingly high reduction in bacterial activity to be considered bactericidal rather than bacteriostatic. Individual specific organic acids used in preparing the inventive composition resulted in no or minimal reductions in bacterial activity. When combined in the disclosed ratios, however, a surprising and unexpected synergism was observed. Some of the organic acids used in preparing the solution have been explored at higher concentrations as sanitizer treatments for fresh-produce, and after such treatments the treated produce is usually rinsed to remove or reduce residual compounds on the produce surface. The inventive composition requires lower concentrations of each acid to treat fresh-produce and does not require extra rinsing to remove or reduce residual compounds on the produce surface. Furthermore, the solution also acts as a highly effective antibrowning agent by inhibiting browning reaction on the surface of fresh fruits and vegetables.

In embodiments, the inventive composition may be produced by a skilled artisan in a variety of ways. For example, 100 mL 0.02N HCl might be added to 1000 mL deionized distilled water (dd$H_2O$) to create a base solution, adjust the pH to 3.4, and the components in the inventive composition of oxalic acid, citric acid, ascorbic acid, lactic acid, and hydrogen peroxide could be added in a specific order to achieve the final desired concentration as disclosed herein. It should be appreciated that a skilled artisan may select to combine the ingredients of the inventive composition in a different order than the examples herein while maintaining the desired antimicrobial and antibrowning characteristics. For example, to the base solution above lactic acid and hydrogen peroxide are added and stirred until dissolved (e.g., about 5 min) followed by addition of oxalic acid, citric acid, and ascorbic acid are added in order. The pH of the final solution is typically about 3 and adjusted if needed.

Methods of using the inventive composition include applying the composition to produce in an effective amount to provide antibacterial and antibrowning protection to the produce. The method may include targeting one or more species and up to all of the species of bacteria on the produce. Target bacterial species may include any gram-negative or gram-positive bacteria which might be pathogenic and/or harmful to the fruits or vegetables. The composition is generally applied refrigerated (e.g., about 5° C.) or at room temperature (22° C.±5° C.); however, it should be appreciated that it may be applied at any temperature as determined for a particular set of circumstances by a skilled artisan. The composition could be applied in any suitable mechanism such as by dipping in a basin, spraying with appropriate pressure, or any other suitable method of applying the composition. The application may also include contacting the composition with the produce as well as any equipment (e.g., conveyors, cutter heads, and other equipment). Though generally potable, chilled water and not recycled water is used as the solvent for the inventive composition. Other components, including chlorine-based compounds, may also be present in alternative embodiments. In embodiments, the inventive composition is used in the absence of ethanol. It should be appreciated that one skilled in the art would adjust the pressure and volume of the composition to be applied as well as adjusting the throughput of produce. A modest amount of experimentation will enable those skilled in the art of processing fresh produce to optimize application of the disclosed composition for specific circumstances. Though not necessary, a skilled artisan may select to rinse the inventive composition under certain circumstances or conditions as desired.

In embodiments, the inventive composition reduces bacterial populations on produce by greater than at least about 2 log CFU/g, or at least about 3 log CFU/g, or at least about 4 log CFU/g, or at least about 5 log CFU/g, or at least about 6 log CFU/g, or at least about 7 log CFU/g, or at least about 8 log CFU/g, or at least about 9-10 log CFU/g as compared to the individual components acting alone or in other combinations. It should be appreciated that the present invention may be used on any type of whole or cut/sliced produce including fruits, vegetables, leafy greens, etc. (the term "produce" includes whole or cut/sliced fruits, vegetables, leafy greens, etc.) and the particular reduction in bacterial populations may differ under various conditions.

Other compounds may be added to the composition provided they do not substantially interfere with the intended activity and efficacy of the composition, whether or not a compound interferes with activity and/or efficacy can be determined, for example, by the procedures utilized herein. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurement.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions (e.g., reaction time, temperature), percentages and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 10% to a reference quantity, level, value, or amount. For example, about 1.0 g means 0.9 g to 1.1 g and all values within that range, whether specifically stated or not.

The following examples are intended only to further illustrate the invention and are not intended in any way to limit the scope of the invention as defined by the claims.

Example 1

This example illustrates preparation of bacterial strains and inocula for testing the inventive compositions as well as antimicrobial activities of the individual components. Bacterial strains used in this example were *Escherichia coli* O157:H7 strains SEA13B88, ATCC 25922 and Oklahoma (apple juice cider-related outbreaks); *Salmonella* Stanley H0558 (alfalfa sprout-related outbreak, obtained from Dr. Patricia Griffin, CDC), *Salmonella* Poona RM2350, *Salmonella* Saphra 97A3312 (cantaloupe-related outbreaks, obtained from Ms. Sharon Abbott and Dr. Michael Janda, CA Dept. of Health Services); and *L. monocytogenes* F8027 (Serotype 4b) and F8385 (Serotype 1/2b) received from Dr. Larry Beuchat, University of Georgia. Bacteria were maintained on Brain Heart Infusion Agar (BHIA, BBL/Difco, Sparks, M.D.) slants held at 4° C. Prior to use, the cultures were subjected to two successive transfers by loop inocula to 10 mL Brain Heart Infusion Broth (BHIB, Difco) (*Salmonella* and *E. coli*) or 10 mL Trypticase Soy Broth supplemented with 0.6% yeast extract (TSBYE, BBL/Difco) (*L. monocytogenes*). A final transfer of individual strains at 0.2 mL was made into 20 mL BHI or TSBY with incubation at 36° C. for 18 h under static conditions. The bacterial cells were centrifuged at 10,000 g for 10 min at 4° C. and the cell pellets for *L. monocytogenes, Salmonella* spp., and *E. coli* O157:H7 were washed twice in 0.1% peptone water solution (PW, BBL/Difco) and subsequently combined and resuspended to prepare three different types of inoculum described below. Bacterial inoculum for *Escherichia coli* O157:H7, *Salmonella* spp., and *L. monocytogenes* consisted of a mixture containing strains of individual genera (3 strains/genus) listed above at $10^9$ CFU/mL. All inocula were prepared in 3 L of 0.1% (w/v) PW and the final bacterial concentration in the inoculum suspension averaged $10^7$ CFU/mL and was used to inoculate all the tested fruit.

The novel antibrowning-antimicrobial solution of the invention includes several short chain organic acids generally regarded as safe (GRAS-compound). The solution (referred to herein as OHCAL) used for testing in the examples included oxalic acid (0.05%, w/v), citric acid (0.05%, w/v), ascorbic acid (0.5%, w/v), lactic acid (1.5%, w/v), hydrogen peroxide (1%, w/v), and 100 mL 0.02 N hydrochloric acid (HCl, pH 2) in 1000 mL deionized distilled water ($ddH_2O$). The final pH of the OHCAL solution was adjusted to 3.0±0.2, although addition of 0.02 N HCL to the base solution generally obviates the need for pH adjustment. All organic acids were purchased from Fisher Scientific Co. (Pittsburgh, Pa.). In preparing this solution, specific organic acids were selected, and their individual antimicrobial activity was tested against *Salmonella, L. monocytogenes*, and *E. coli* O157:H7 bacteria (FIG. 1). Surprisingly only 1.5% lactic acid and 1% hydrogen peroxide caused a significant reduction of all bacterial pathogens tested. *Listeria monocytogenes* was the most susceptible pathogen in 1.5% lactic acid followed by *Salmonella* and *E. coli* O157:H7, respectively. A similar trend in susceptibility was surprisingly observed in 1% hydrogen peroxide. When all acids were combined (OHCAL) and tested against viable and resting *Salmonella, L. monocytogenes* and *E. coli* O157:H7 bacteria, a surprising and unexpected synergistic effect was observed with a significant 6 log reduction achieved on all the bacterial pathogens.

Figure 2:
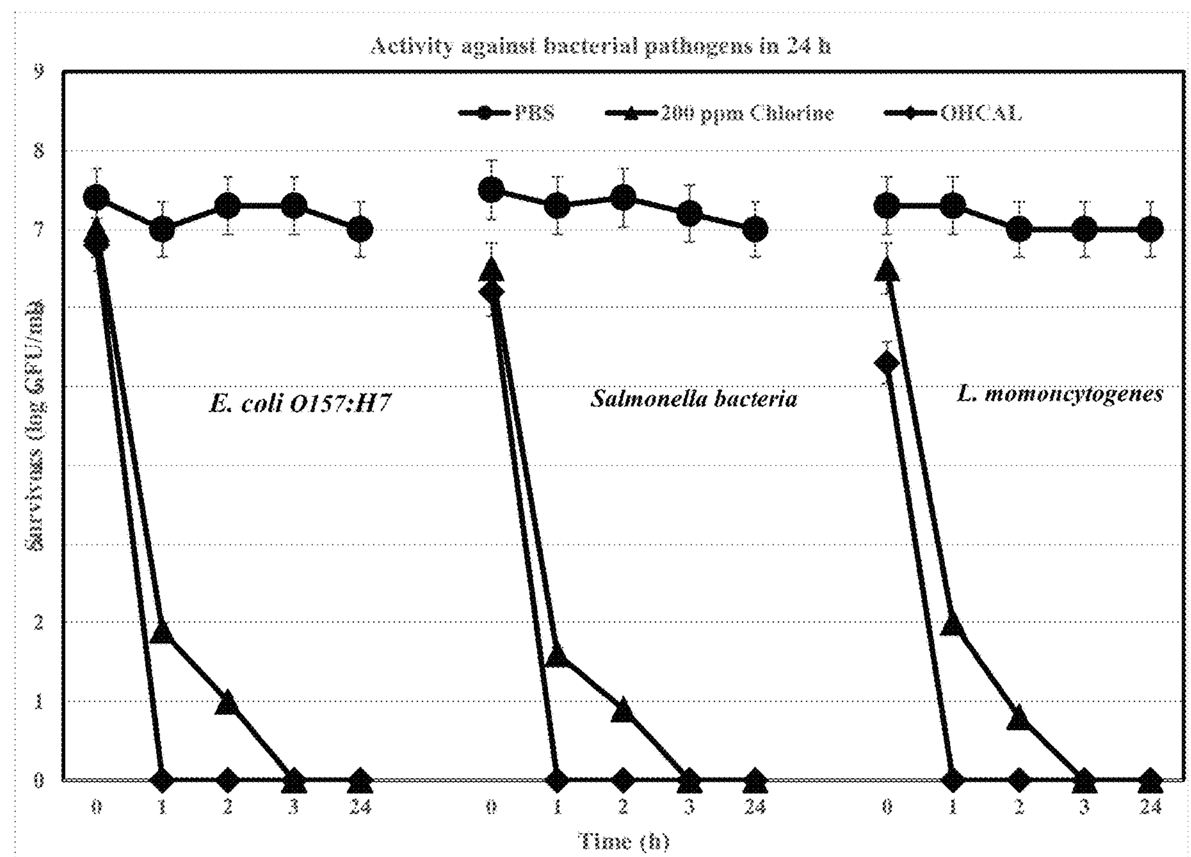
FIG. 2 shows the effect of OHCAL (description below, it stands for all organic acid compounds used n make the solution) solution on inactivation of viable bacterial populations within 24 h contact time as described herein.
Figure 3:
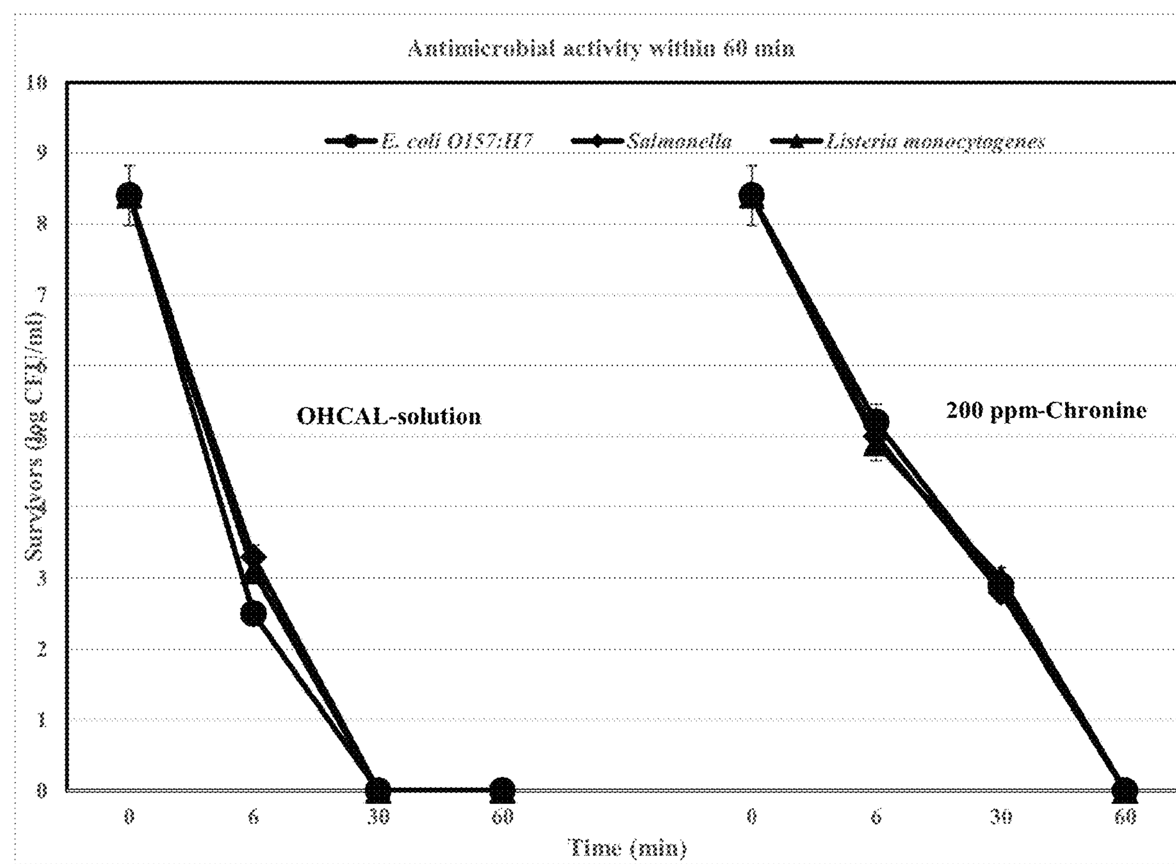
FIG. 3 illustrates the effect of OHCAL solution and 200 ppm chlorine on inactivation of viable bacterial populations within 60 contact time as described herein.

Efficacy of antimicrobial activity of OHCAL against viable *Salmonella, L. monocytogenes*, and *E. coli* O157:H7 bacteria was compared to 200 ppm-chlorine solution for 24 h and the results are shown in FIG. 2. Chlorinated wash-water was prepared at 200±3-ppm chlorine by diluting Clorox® (5.25% sodium hypochlorite (NaOCl), Clorox Company, Oakland Calif.) with sterile deionized distilled water ($ddH_2O$). Total available chlorine in the solution was tested with a chlorine test kit (Hach Co., Ames, Iowa, a U.S. Environmental Protection Agency approved test kit). Again, the antimicrobial activity of both 200 ppm chlorine and OHCAL was compared to resting cells in PBS and the results indicated that OHCAL solution is surprisingly a better antimicrobial solution than 200 ppm chlorine. Individual bacterial pathogens at $10^9$ CFU/mL were added to 9 mL of OHCAL and 200 ppm chlorine sanitizer in 25 mL test tubes for comparison purposes and surviving populations of these bacterial pathogens were enumerated first at 0, 1, 3, 6, and 24 h and 0, 10, 20, 30-min time intervals. Aliquots (0.1 mL) from each tube were plated on selective and non-selective agar plates described below to determine surviving populations of colony forming units (CFU). The colonies enumerated were calculated and reported as $\log_{10}$ CFU/mL. Microbial populations of all pathogens were below detection (<1 CFU/mL) within 1 h contact time for OHCAL and 3 h for 200 ppm chlorine (FIG. 2). Due to the surprisingly excellent antimicrobial activity of OHCAL within 1 h contact time, another study was designed to investigate the activities before the 1 h contact time and the results are shown in FIG. 3. A steep microbial decline was surprisingly observed for all bacterial pathogens in OHCAL than the chlorine solution and within 6 min of inoculation and contact the populations were reduced to approximately 5 logs in OHCAL and 3 logs in 200 ppm chlorine solution. Surprisingly, all pathogen populations were below detection in OHCAL solution within 30 min.

Example 2

This example illustrates the effectiveness and stability of the inventive composition after storage of up to six months at the temperatures indicated in Table 2. It was found that the inventive composition is stable for this time period when stored at both room temperature or refrigerated.

Example 3

This example illustrates the antimicrobial effectiveness of the inventive composition on whole apples. Granny Smith and golden delicious apples were kept inside the refrigerator (~5° C.) until used. On the day of the study, the apples were taken out from the refrigerator and left at room temperature for 18 h inside a laminar flow biological hood (Nuare™, Plymouth, Minn.) to come to room temperature (20° C.±1° C.). Two types of inoculations were performed using the above described inoculum. First, apples were inoculated by dipping inside 1,000 mL bacterial inoculum with constant rotation for 5 min. In another inoculation study, apples were inoculated by spotting 10 drops of 100 µl (~$10^6$ CFU/mL) of *L. monocytogenes* inoculum at the stem/calyx area. All inoculated apples were placed on sterile petri dishes and allowed to air-dry for 1 h at room temperature (20±1° C.) inside a biosafety cabinet. All inoculated apples were stored at 5° C. for 6 d, and at day 0, 3, and 6 the apples were treated as described below. A total of 144 apples were inoculated and stored as described above and then used for the treatment studies. Following inoculation, cell attachment and storage, the apples was subjected to washing treatments using the antibrowning-antimicrobial solution (OHCAL) and 200 ppm chlorinated-water.

Two decontamination treatments were by spotting antimicrobials to specific inoculated areas or by submerging whole inoculated apples into the antimicrobial solution. Approximately 100 µL (ca. 10 drops) of the antimicrobial solution or 200 ppm chlorine was spotted exactly where the bacteria was added and allowed to stay on the spotted area for 3 min. For antimicrobial treatments by submersion, inoculated whole apples were submerged in 1,000 mL antimicrobial solution for 30 min. After treatments, the apples were removed and placed inside a stomacher bag containing 250 mL neutralizing broth. The use of the neutralizing broth (D/E, BD/Difco™) was to arrest the effect of the antimicrobial treatment before microbial analysis.

Treated and untreated apples weighing approximately 50 g were blended (Waring commercial blender, speed level 5, 1 min) in 250 mL of 0.1% peptone-water (PW) or 250 mL of neutralizing broth (NB) depending on the type of treatments prior to microbial analysis. Decimal dilutions of the sample were made with 0.1% PW (BBL/Difco), and 0.1 mL portions were plated in duplicate on tryptic soy agar (TSA; BBL/Difco) and incubated at 35° C. for 24 h for enumeration of mesophilic aerobic bacteria (Ukuku et al., 2009), and plates of Potato Dextrose Agar (BBL/Difco) acidified with 10% tartaric acid (PDAA) to pH 3.5 incubated at 25° C. for 5 days, were used for enumeration of yeast and molds (Ukuku et al., 2005). For lactic acid bacteria (LAB), deMan Rogosa Sharpe agar (MRS; BD Difco) was used and the plates were incubated at 35° C. for 3-5 days (Kalschne, et al. 2015).

Figure 4:
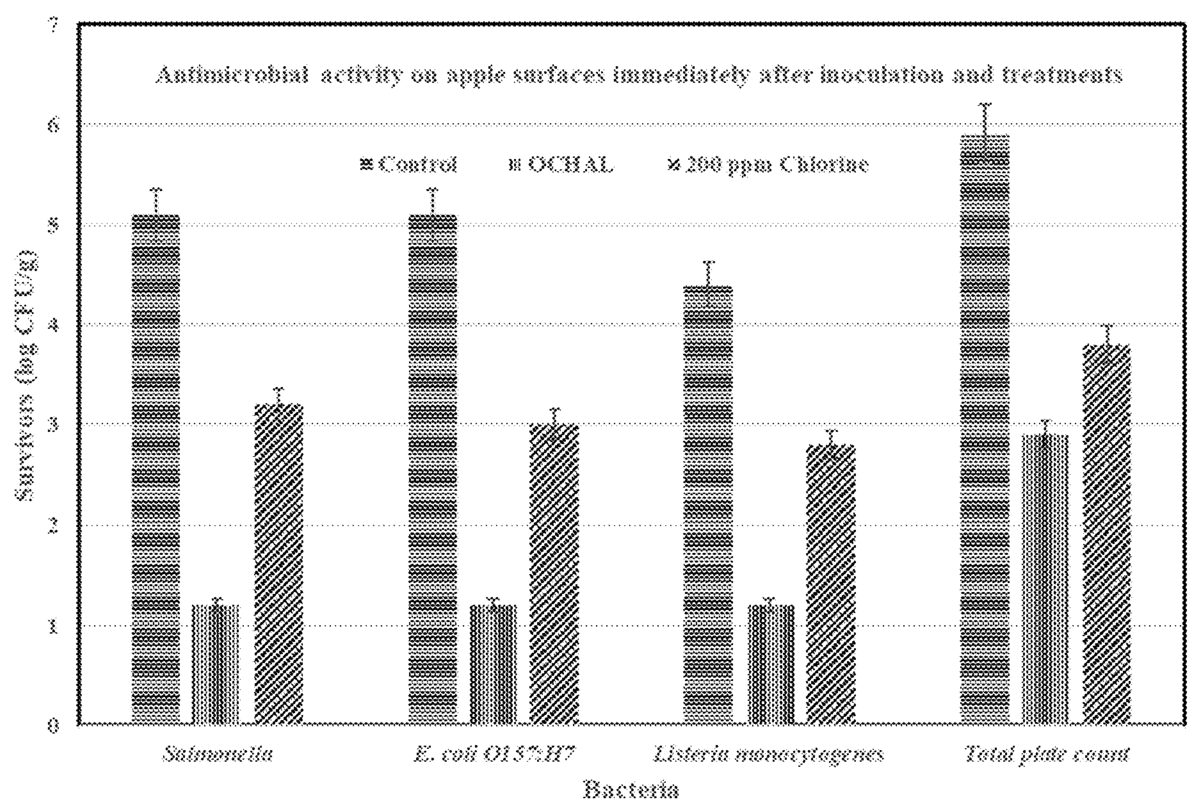
FIG. 4 shows the antimicrobial effect of OHCAL and 200 ppm chlorine on inactivation of *Salmonella, E. coli* O157:H7, and *L. monocytogenes* and total plate count of bacterial populations on apple surfaces treated for 3 min as described herein.

Antimicrobial activity of OHCAL and 200 ppm chlorine against *Salmonella, L. monocytogenes*, and *E. coli* O157:H7 bacteria inoculated on apples is shown in FIG. 4. A significant log reduction for total plate count bacteria, *L. monocytogenes, E. coli* O157:H7, and *Salmonella* bacteria was surprisingly achieved with OHCAL solution than 200 ppm chlorine. An average of 3.8 log reduction for all bacterial pathogens on apples were surprisingly achieved compared to approximately 2 log for 200 ppm chlorine.

Example 4

This example illustrates the antimicrobial and antibrowning effectiveness of the inventive composition on fresh-cut apples. Granny Smith and golden delicious apples were cut with a sterilized stainless-steel knife into 4 wedges. Each of the 4 wedges was further cut longitudinally into 2 with another sterilized stainless-steel knife. The core and the seeds were removed, and the fresh-cut pieces were cut diagonally (~3 cm) before dipping or submerging in each bacterial inoculum at $10^6$ CFU/mL described above for 3 min. Sterilized long glass rods were used to stir the fresh-cut pieces inside the inoculum and after 3 min the pieces were removed and placed inside a biohood before treating with the indicated solution for 3 min. All fresh-cut pieces dipped or without dipping in the solutions were placed inside stomacher bags and stored inside a refrigerator (4±1° C.) for 7 days, and physical observation for changes in color or any other deformation including presence of mold were monitored at day 0, 2, 4, and 6 of storage.

Figure 5:
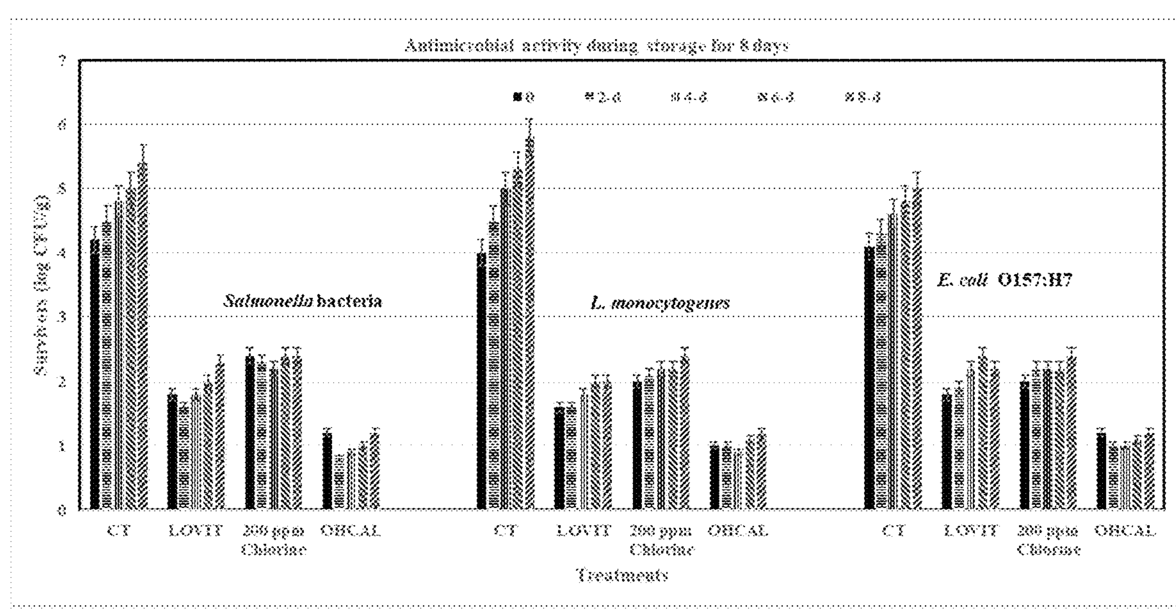
FIG. 5 illustrates the antimicrobial effect of OHCAL and 200 ppm chlorine on inactivation of *Salmonella, E. coli* O157:H7, and *L. monocytogenes* during storage of treated fresh-cut apple pieces stored at 5° C. for 8 days as described herein.

Antimicrobial activity of the solutions on *L. monocytogenes, E. coli* O157:H7, and *Salmonella* bacteria inoculated on fresh-cut apple pieces were investigated during storage at 5° C. for 8 days and the results are shown in FIG. 5. The antimicrobial activity of OHCAL was also compared to another comparative treatment (referred to as Lovit). Again, OHCAL surprisingly indicated a better antimicrobial solution than 200-ppm chlorine and the Lovit solution throughout days of storage.

Figure 6:
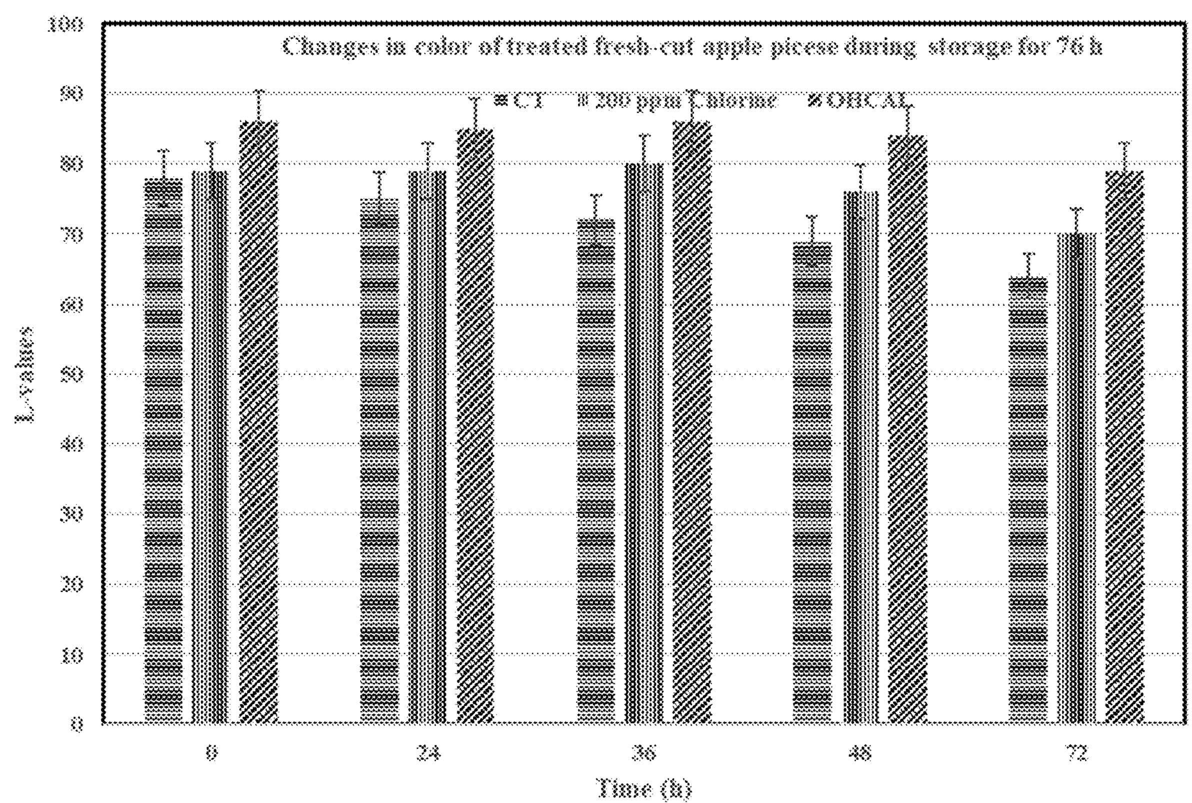
FIG. 6 shows the effect of OHCAL and 200 ppm chlorine treatments of fresh-cut apple pieces and storage time on chromogenic L* values during storage at 5° C. for 72 h as described herein.

Color (CIE L*, a*, b*) of the slices was measured with a CR-400 Chroma meter (Konica Minolta Sensing Americas, NJ) using a 8 mm measuring aperture every three days during storage as shown on FIG. 6 (Chen, Z., et al., Postharvest Biology and Technology 58: 232-238, (2010)). The colorimeter was calibrated using the standard light trap and a white tile (L*59.51, a*13.08 and b*37.99). D65 were the illuminant/viewing geometry. Two readings were taken on randomly selected opposite cut surfaces of each piece. Again, 5 out of 8 pieces per plate were measured for each experiment. Hue and chroma values were calculated from the following equations: $Hue=\tan^{-1}(b^*/a^*)$ and $chroma=(a^{*2}+b^{*2})^{1/2}$. Changes in color of fresh-cut apple pieces dipped the solutions for 4 min was evaluated during storage at 5° C. for 72 h using colorimeter and the results are shown in FIG. 6. Fresh-cut pieces dipped in OHCAL solution surprisingly maintained a higher L* values than cut pieces dipped in 200-ppm chlorine and the control untreated cut pieces.

Figure 7:
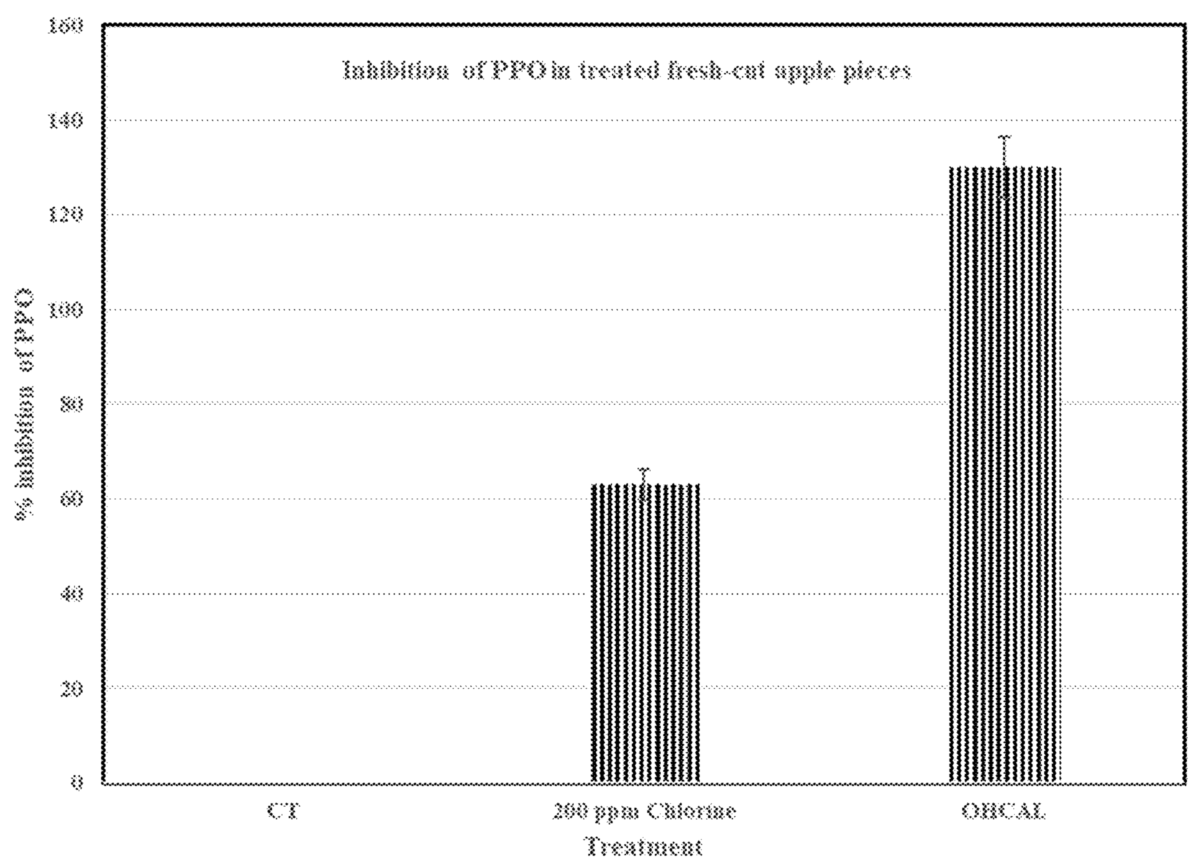
FIG. 7 illustrates percent inhibition of polyphenol oxidase (PPO) by OHCAL formulation and 200 ppm chlorine as described herein.
Figure 8:
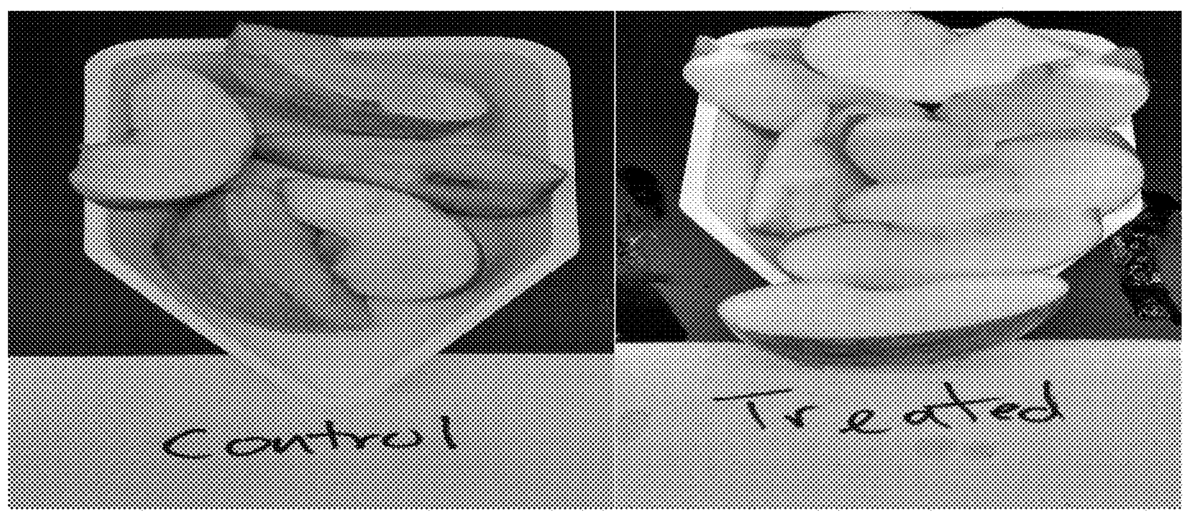
FIG. 8 photographically shows of the effect of OHCAL on golden delicious fresh-cut apples after treatment and storage at 5° C. for three days as described herein.
Figure 9:
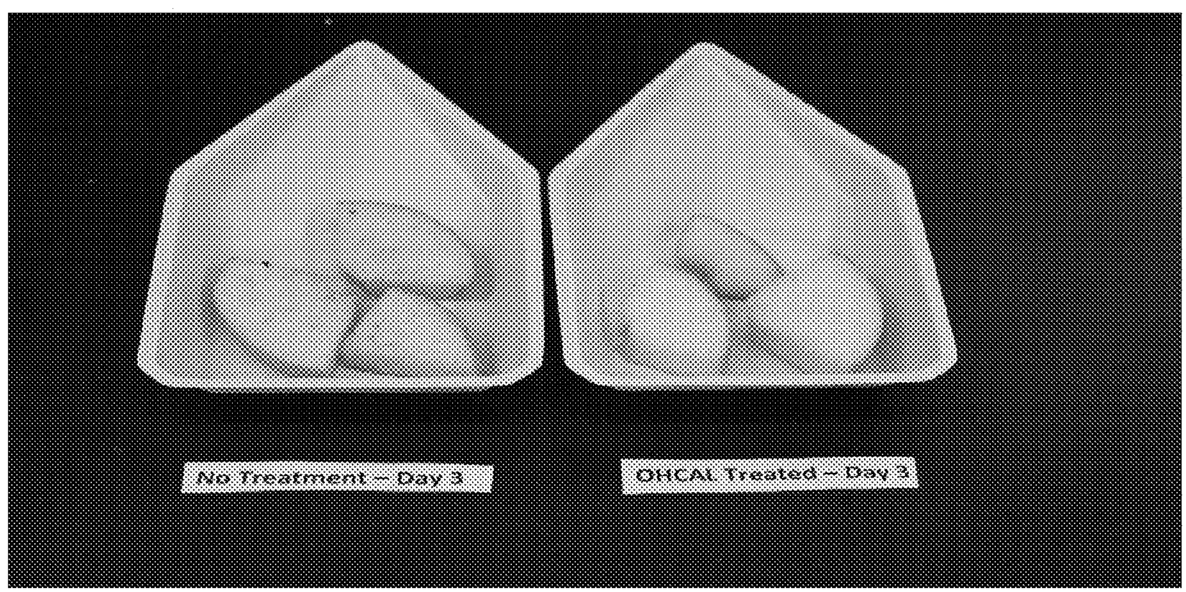
FIG. 9 photographically illustrates the effect of OHCAL on Granny Smith fresh-cut apples after treatment and storage at 5° C. for three days as described herein.
Figure 10:
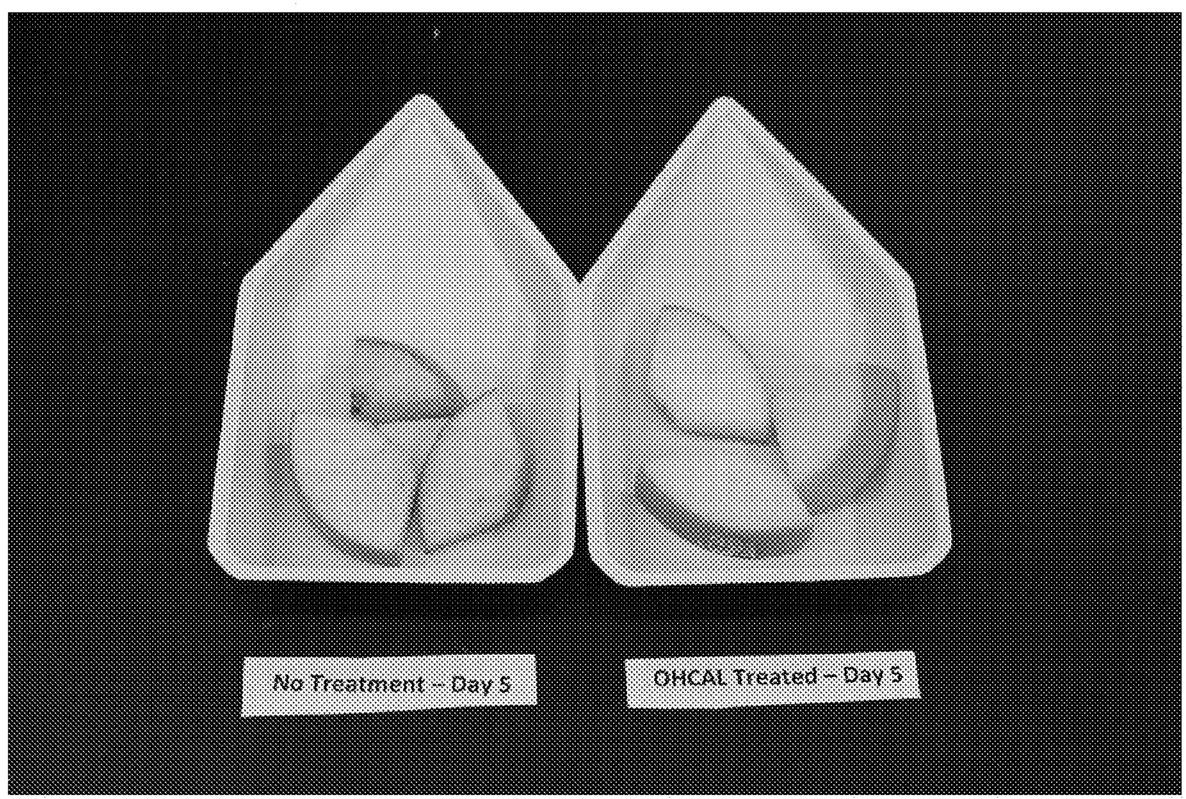
FIG. 10 photographically shows Effect of OHCAL on Granny Smith fresh-cut apples after treatment and storage at 5° C. for five days as described herein.

Similarly, the ability of OHCAL to inhibit PPO in fresh-cut apples was compared the results to 200 ppm chlorine and the untreated control fresh-cut pieces (FIG. 7). 50 g of apple slices was blended (Waring commercial blender, speed level 5, 1 min) with 50 mL of 0.2 M sodium phosphate buffer (pH 6.5). The homogenate was centrifuged at 12500 rpm for 15 min at 5° C. (Sorvall RC $6^+$, Thermo Scientific, Langenselbold, Germany). The supernatant was collected and filtered through Whatman #1 paper and the resulting solution was used to measure PPO levels. The PPO in the apple slices was determined according to method of Rojas-Grau, M. A., et al., (2008), and the enzyme activity was determined using chlorogenic acid as described by He et al., (2008). The reaction mixture (5 mL) consisted of 0.05 mol/L in 2.5 mL acetate buffer at pH5.2. A 0.5 mL acetate buffer was used for the control while 0.5 mL of 0.02 mM chlorogenic acid solution in acetate buffer and 0.05 mL PPO extract were used. Oxidative reaction of chromogenic acid catalyzed by PPO at room temperature (22° C.) was investigated. Aliquots of about 0.300 mL PPO were added to each combination of ingredients. For reference the chlorogenic acid solution and acetate buffer were used and the changes in absorbance at room temperature (22±1° C.) were determined at 420 nm using a DU*-530 life science UV/VIS spectrophotometer (Beckman Coulter, Inc., Atlanta, Ga.). The initial reaction rates based on enzyme activity was determined and the inhibition of PPO activity was expressed as percent inhibition as follows: Inhibition (%)=[(PPO control−PPO treatment)/PPO control]×100. Again, the result indicates that OHCAL was surprisingly able to inhibit PPO. Not intending to be theory bound, the inhibition of PPO could have been the reason for the surprisingly superior anti-browning results photographically shown in the FIG. 8, FIG. 9, and FIG. 10 and are in agreement with the PPO data shown in FIG. 7.

All experiments were done in triplicate with duplicate samples analyzed at each sampling time. Data from each treatment were subjected to the Statistical Analysis System (SAS Institute, Cary, N.C.) for analysis of variance (ANOVA) and the Bonferroni LSD method (Miller 1981) to determine significant differences between treatments and survival or viability loss during storage. Most of the surviving bacteria on the treated produce were recovered at the calyx area or the stem scare area (i.e., blossom area) of whole apples suggesting that bacteria attached within these areas were less sensitive to the treatments. Bacterial populations recovered from fresh-cut pieces prepared from inoculated whole fruits submerged in OHCAL solution before fresh-cut preparation were surprisingly below detection (<1 CFU/g). When the fresh-cut pieces from the fruits treated with OHCAL solution were again treated by submerging in OHCAL solution for extra 3 min before bagging in stomacher bags, all transferred residual bacterial pathogens were surprisingly negative on the fresh-cut pieces after enrichment procedures. When fresh-cut pieces were artificially inoculated with each of the bacterial pathogen at approximately 2 log CFU/g and then treated with the OHCAL solution for 3 min, the surviving populations recovered from the treated cut pieces surprisingly averaged <1 CFU/g and the treatment was surprising bactercidal to the surviving population throughout storage at 5° C. These results were surprising in the amount of synergy among the components of OHCAL and showed the solution is a better antimicrobial alternative than 200 ppm chlorine solution. Also, the efficacy of antibrowning activity of OHCAL as indicated by the L*-values of all treated fresh-cut apples was surprisingly also significantly better than 200 ppm chlorine solution. The results indicate that the OHCAL treatment surprisingly suppressed or inhibited the enzymatic action of the PPO to prevent the conversion of 0-quinone to quinoidal compounds that leads to browning.

While this invention may be embodied in many different forms, there are described in detail herein specific preferred embodiments of the invention. The present disclosure is an exemplification of the principles of the invention and is not intended to limit the invention to the particular embodiments illustrated.

All patents, patent applications, scientific papers, and any other referenced materials mentioned herein are incorporated by reference in their entirety, including any materials cited within such referenced materials.

In addition to the citations above, the contents of the following references are also incorporated herein by reference in their entirety: US 2016/0302455; Andrews, W. H., et al., *Salmonella*, IN: FDA Bacteriological Analytical Manual, 8th ed., Chapter 5, Food and Drug Administration, Washington, D.C., 2018; Brown, P. K., et al., Mol. Microbiol., 41: 349-363 (2001); Burnett, S. L., et al., Appl. Environ. Microbiol., 66: 4679-4687 (2000); Castillo, A., et al., Journal of Food Protection, 67(4): 713-720 (2004); Danyluk, M. D., Outbreaks of Foodborne Disease Associated with Fruit and Vegetable Juices, 1922-20101, FSHN12-04, Food Science and Human Nutrition Department, Florida Cooperative Extension Service, Institute of Food and Agricultural Sciences, University of Florida, 2012; Dickson, J. S., and M. Koohmaraie, Appl. Environ. Microbiol., 55: 832-836 (1989); CDC, Investigation update: multistate outbreak of *Salmonella Panama* infections linked to cantaloupe, National Center for Emerging and Zoonotic Infectious Diseases, 2011; Dewey-Mattia, D., et al., Surveillance for Foodborne Disease Outbreaks—United States, 2009-2015, MMWR Surveill Summ., 67 (No. SS-10): 1-11 (2018); FDA, Guidance for Industry: Guide to Minimize Microbial Food Safety Hazards of Fresh-cut Fruits and Vegetables, 2008; Frank, J. F., Adv. Food Nutr. Res., 43: 320-370 (2000); McGlynn, W., Guidelines for the use of chlorine bleach as a sanitizer in food processing operations, Food Technology Fact Sheet; Miller, R. G., Jr., Simultaneous Statistical Inference, 2nd Edn., Springer-Verlag, New York, pp. 67-70 (1981); Strom, M. S., and S. Lory, Annu. Rev. Microbiol., 47: 565-596 (1993); Takeuchi, K., et al., J. Food Prot., 63: 1433-1437 (2000); Ukuku, D. O., and William Fett, J. Food Prot., 69: 1835-1843 (2006); Ukuku, D. O., et al., Inter. J. Food Microbiol., 231: 86-02 (2016); Ukuku, D. O., et al., Survival, Injury and Inactivation of Human Bacterial Pathogens in Foods: Effect of Non-Thermal Treatments, IN: Foodborne Pathogens and Food Safety (Food Biology Series), 2015, CRC Press, Boca Raton, Fla.; Ukuku, D., et al., J. Food Prot., 78:1288-1295 (2014); Ukuku, D. O., and W. F. Fett, Journal of Food Protection, 67(5): 999-1004 (2004); Ukuku, D. O., et al., J. Food Prot., 78: 1288-1295 (2015); Van der Mei, H. C., et al., Assessment of microbial cell surface hydrophobicity, pp. 263-288 (1991), IN: N. Mozes, P. S. Handley, H. J. Busscher, and P. G. Rouxhet, (eds.), Microbial cell surface analysis, VCH, New York; Zogaj, X., et al., Mol. Microbiol., 39: 1452-1463 (2001).

Thus, in view of the above, there is described (in part) the following: ***

A composition comprising (or consisting essentially of or consisting of) a mixture of oxalic acid, citric acid, ascorbic acid, lactic acid, and hydrogen peroxide. The above composition, wherein the mixture comprises on a weight-to-volume basis in an aqueous solution from about 0.05% to about 8% oxalic acid, from about 0.05% to about 10% citric acid, from about 0.5% to about 25% ascorbic acid, from about 0.5% to about 10% lactic acid, and from about 0.5% to about 5% hydrogen peroxide. The above composition, wherein the mixture comprises on a weight-to-volume basis in an aqueous solution from about 0.05% to about 5% oxalic acid, from about 0.05% to about 5% citric acid, from about 0.5% to about 15% ascorbic acid, from about 0.5% to about 5% lactic acid, and from about 0.5% to about 3% hydrogen peroxide. The above composition, wherein the mixture comprises on a weight-to-volume basis in an aqueous solution from about 0.05% to about 3% oxalic acid, from about 0.05% to about 2% citric acid, from about 0.5% to about 3% ascorbic acid, from about 0.5% to about 2% lactic acid, and from about 0.5% to about 2.5% hydrogen peroxide. The above composition, wherein the mixture comprises on a weight-to-volume basis in an aqueous solution from about 0.05% to about 1% oxalic acid, from about 0.05% to about 1% citric acid, from about 0.5% to about 3% ascorbic acid, from about 0.5% to about 1.5% lactic acid, and from about 0.5% to about 1% hydrogen peroxide. The above composition, wherein the mixture comprises on a weight-to-volume basis in an aqueous solution about 0.05% oxalic acid, about 0.05% citric acid, about 0.5% ascorbic acid, about 1.5% lactic acid, and about 1% hydrogen peroxide. The above composition, wherein said composition is produced by a method comprising mixing a solution of inorganic acid and water to create a base solution; adding in order oxalic acid, citric acid, ascorbic acid, lactic acid, and hydrogen peroxide to the base solution to create the composition; and optionally adjusting the pH of the composition.

A method of reducing target bacteria and browning on produce, the method comprising (or consisting essentially of or consisting of) applying the composition of claim 1 to said produce. The above method, wherein target bacteria are undetectable within less than about 1 hour of exposure of said produce the above composition. The above method, wherein said browning is enzymatic browning.

A kit for carrying out the above method, the kit comprising (or consisting essentially of or consisting of) a first container means containing the composition or a concentrated form of the composition; optionally other container means comprising a solution, diluent, or applicator for the composition; and written information including procedures for preparing the composition or diluting the concentrated form of the composition and applying the composition to said produce.

A method of producing the above composition, the method comprising (or consisting essentially of or consisting of) mixing a solution of inorganic acid and water to create a base solution; adding in order oxalic acid, citric acid, ascorbic acid, lactic acid, and hydrogen peroxide to the base solution to create the composition; and optionally adjusting the pH of the composition.

Furthermore, the invention encompasses any possible combination of some or all of the various embodiments and characteristics described herein and/or incorporated herein. In addition the invention encompasses any possible combination that also specifically excludes any one or some of the various embodiments and characteristics described herein and/or incorporated herein.

The term "consisting essentially of" excludes additional method steps or composition components that substantially interfere with the intended activity of the methods or compositions of the invention and can be readily determined by those skilled in the art (e.g., from a consideration of this specification or practice of the invention disclosed herein). This term may be substituted for inclusive terms such as "comprising" or "including" to more narrowly define any of the disclosed embodiments or combinations/sub-combinations thereof. Furthermore, the exclusive term "consisting" is also understood to be substitutable for these inclusive terms in alternative forms of the disclosed embodiments.

The invention illustratively disclosed herein suitably may be practiced in the absence of any element (e.g., method (or process) steps or composition components) which is not specifically disclosed herein. Thus, the specification includes disclosure by silence ("Negative Limitations In Patent Claims," AIPLA Quarterly Journal, Tom Brody, 41(1): 46-47 (2013): " . . . Written support for a negative limitation may also be argued through the absence of the excluded element in the specification, known as disclosure by silence . . . . Silence in the specification may be used to establish written description support for a negative limitation. As an example, in Ex parte Lin [No. 2009-0486, at 2, 6 (B.P.A.I. May 7, 2009)] the negative limitation was added by amendment . . . . In other words, the inventor argued an example that passively complied with the requirements of the negative limitation . . . was sufficient to provide support . . . . This case shows that written description support for a negative limitation can be found by one or more disclosures of an embodiment that obeys what is required by the negative limitation . . . ."

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims. Although any methods and materials similar or equivalent to those described herein can be used in the practice or testing of the present invention, the preferred methods and materials are herein described. Those skilled in the art may recognize other equivalents to the specific embodiments described herein which equivalents are intended to be encompassed by the claims attached hereto.

TABLE 1

| Ingredient | Broadest | Broad | Intermediate | Narrow |
|---|---|---|---|---|
| Oxalic Acid | 0.05-8 | 0.05-5 | 0.05-3 | 0.05-1 |
| Citric Acid | 0.05-10 | 0.05-5 | 0.05-2 | 0.05-1 |
| Ascorbic Acid | 0.5-25 | 0.5-15 | 0.5-3 | 0.5-1 |
| Lactic Acid | 0.5-10 | 0.5-5 | 0.5-2 | 0.5-1.5 |
| $H_2O_2$ | 0.5-5 | 0.5-3 | 0.5-2.5 | 0.5-1 |

TABLE 2

| Bacteria | Storage temperature | 1 month Log CFU/mL | 3 months Log CFU/mL | 6 months Log CFU/mL |
|---|---|---|---|---|
| *L.* | 5° C. | 9.2 ± 0.12 | 8.8 ± 0.11 | 9.1 ± 0.12 |
| *monocytogenes* | 22° C. | 8.9 ± 0.13 | 8.9 ± 0.10 | 8.7 ± 0.12 |
| *E. coli* | 5° C. | 9.2 ± 0.12 | 8.8 ± 0.11 | 9.1 ± 0.12 |
| O157:H7 | 22° C. | 8.9 ± 0.13 | 8.9 ± 0.10 | 8.7 ± 0.12 |
| *Salmonella* | 5° C. | 9.4 ± 0.10 | 9.2 ± 0.11 | 9.1 ± 0.12 |
| spp. | 22° C. | 9.2 ± 0.13 | 8.9 ± 0.10 | 8.9 ± 0.12 |

The claimed invention is:

1. A composition comprising a on a weight-to-volume basis in an aqueous solution about 0.05% oxalic acid, about 0.05% citric acid, about 0.5% ascorbic acid, about 1.5% lactic acid, and about 1% hydrogen peroxide, adjusted to a final pH in the range of about 3 to about 6.

2. The composition of claim 1, wherein said composition is produced by a method comprising mixing a solution of inorganic acid and water to create a base solution; adding in order about 0.05% oxalic acid, about 0.05% citric acid, about 0.5% ascorbic acid, about 1.5% lactic acid, and about 1% hydrogen peroxide to the base solution to create the composition; and optionally adjusting the pH of the composition to a final pH in the range from about 3 to about 6.

3. A method of reducing target bacteria and browning on produce, the method comprising applying the composition of claim 1 to said produce.

4. The method of claim 3, wherein target bacteria are undetectable within less than about 1 hour of exposure of said produce to the composition.

5. The method of claim 3, wherein said browning is enzymatic browning.

6. A kit for carrying out the method of claim 3, the kit comprising a first container means containing the composition or a concentrated form of the composition; optionally other container means comprising a solution, diluent, or applicator for the composition; and written information including procedures for preparing the composition or diluting the concentrated form of the composition and applying the composition to said produce.

7. A method of producing the composition of claim 1, the method comprising mixing a solution of inorganic acid and water to create a base solution; adding in order oxalic acid, citric acid, ascorbic acid, lactic acid, and hydrogen peroxide to the base solution to create the composition; and optionally adjusting the pH of the composition to a final pH in the range from about 3 to about 6.

8. A composition comprising a on a weight-to-volume basis in an aqueous solution about 0.05% oxalic acid, about 0.05% citric acid, about 0.5% ascorbic acid, about 1.5% lactic acid, and about 1% hydrogen peroxide, adjusted to a final pH in the range of about 3 to about 6; wherein the composition reduces bacteria and browning on produce by at least 2 log CFU/g as compared to a composition lacking at least one of oxalic acid, citric acid, ascorbic acid, lactic acid, or hydrogen peroxide.

* * * * *